(12) United States Patent
Oh et al.

(10) Patent No.: US 8,169,675 B2
(45) Date of Patent: *May 1, 2012

(54) APPARATUS AND METHOD FOR CREATING PREVIEW IMAGE OF OBJECT

(75) Inventors: Hyun-soo Oh, Suwon-si (KR); Kyeong-man Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/926,244

(22) Filed: Nov. 4, 2010

(65) Prior Publication Data

US 2011/0055695 A1    Mar. 3, 2011

Related U.S. Application Data

(63) Continuation of application No. 11/516,550, filed on Sep. 7, 2006, now Pat. No. 7,852,534.

(30) Foreign Application Priority Data

Sep. 27, 2005   (KR) ........................ 10-2005-0089690

(51) Int. Cl.
*G03F 3/10* (2006.01)
*G03F 3/08* (2006.01)
*H04N 1/46* (2006.01)
*G06K 9/00* (2006.01)

(52) U.S. Cl. ......... 358/527; 358/518; 358/504; 358/1.9; 382/162; 382/167

(58) Field of Classification Search .................. 358/527, 358/518, 1.9, 3.13, 3.06, 504; 382/162, 167, 382/232, 239; 345/589; 715/700
See application file for complete search history.

(56) References Cited

U.S. PATENT DOCUMENTS 5,801,855 A    9/1998   Ohta
(Continued)

FOREIGN PATENT DOCUMENTS

| EP | 1 294 177 | 3/2003 |
| JP | 2002-290753 | 4/2002 |
| KR | 10-2002-0073759 | 9/2002 |

OTHER PUBLICATIONS

Eli Peli, Contrast in Complex Images, Oct. 1990, Eye Research Institute, J. Opt. Soc. Am. A/vol. 7, No. 10, pp. 2032-2040.

*Primary Examiner* — Charlotte M Baker
(74) *Attorney, Agent, or Firm* — Roylance, Abrams, Berdo & Goodman, L.L.P.

(57) ABSTRACT

Apparatus and method for creating a preview image of an object is provided. The apparatus includes an object type detecting unit for detecting an object to be previewed for determining whether the type of the object is text, graphics, and image, a color matching unit for converting a color signal of the detected object into an image forming color signal by using a color profile corresponding to the detected object according to the detection result of the object type detecting unit, and a preview image creating unit for creating and displaying a preview image for the object converted into the image forming color signal. Therefore, because the preview image is displayed on a monitor according to the type of object (text, graphics, or image), a user can predict the image forming result more accurately. Further, because the colors of objects can be adjusted, a printout with desired color characteristics can be obtained.

16 Claims, 2 Drawing Sheets

U.S. PATENT DOCUMENTS

| | | |
|---|---|---|
| 5,844,689 A | 12/1998 | Kawase |
| 6,351,320 B1 | 2/2002 | Shin |
| 7,085,006 B2 | 8/2006 | Yokoyama et al. |
| 7,221,483 B2 * | 5/2007 | Yagishita et al. ............ 358/3.13 |
| 7,380,208 B2 | 5/2008 | Ishii et al. |
| 2003/0053094 A1 * | 3/2003 | Ohga et al. .................... 358/1.9 |
| 2005/0122533 A1 | 6/2005 | Nakagawa |
| 2006/0279783 A1 | 12/2006 | Kato |

* cited by examiner

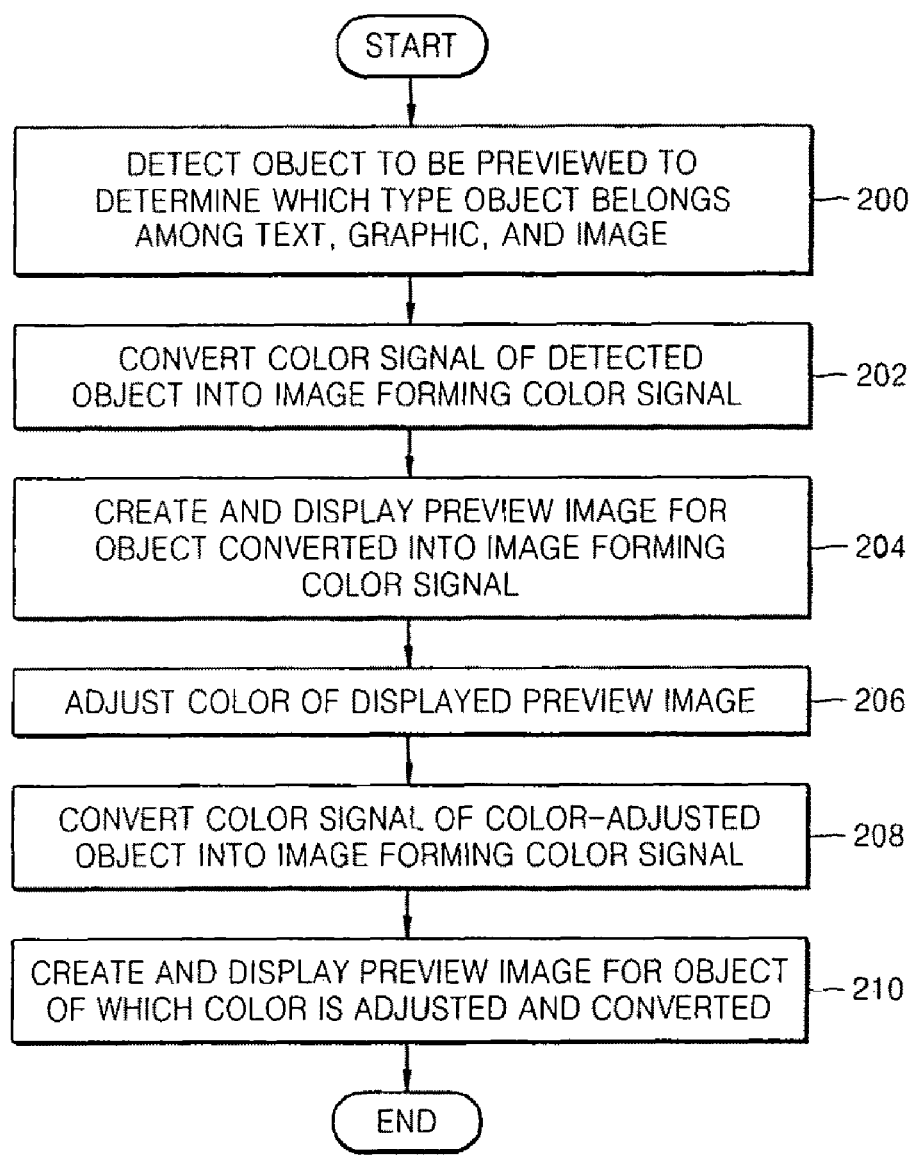

APPARATUS AND METHOD FOR CREATING PREVIEW IMAGE OF OBJECT

CROSS-REFERENCE TO RELATED PATENT APPLICATION

This application is a continuation of U.S. patent application Ser. No. 11/516,550, filed on Sep. 7, 2006 now U.S. Pat. No. 7,852,534, which This application claims the benefit under 35 U.S.C. §119(a) of Korean Patent Application No. 10-2005-0089690, filed on Sep. 27, 2005, in the Korean Intellectual Property Office. The entire contents of both of said applications are hereby incorporated by reference.

BACKGROUND OF THE INVENTION

1. Field of the Invention

The present invention relates to an apparatus and method for creating a preview image of an object. More particularly, the present invention relates to an apparatus and method for creating a preview image of an object according to the type of object to be printed.

2. Description of the Related Art

Application programs such as Photoshop and Paintshop provide a preview image of an object to be printed for users to check the characteristics (such as brightness and saturation) of the object. Through the preview image, users can see how the color characteristics of the object will be presented by a printer before printing.

Application programs for processing text and graphics, such as MS Word and PowerPoint, do not, however, provide a preview image showing the color characteristics such as brightness and saturation of an object to be printed. A preview image provided by a print driver of a text or graphics application program is designed to show only the print layout. That is, the text or graphic application programs do not provide a preview image showing the characteristics (such as brightness and saturation) of an object to be printed.

Accordingly, there is a need for an improved apparatus and method for creating a preview image of an object.

SUMMARY OF THE INVENTION

An aspect of the present invention is to address at least the above problems and/or disadvantages and to provide at least the advantages described below. Accordingly, an aspect of the present invention is to provide an apparatus and method for creating a preview image of an object, which is designed to provide a preview image of an object to be printed according to the type of the object such as text, graphic, or image.

According to an aspect of the present invention, an apparatus for creating a preview image for an object includes an object type detecting unit for detecting an object to determine whether the type of the object is text, graphics, or image, a color matching unit for converting a color signal of the detected object into an image forming color signal by using a color profile corresponding to the detected object type, and a preview image creating unit for creating and displaying a preview image for the object converted into the image forming color signal.

According to another aspect of the present invention, a method of creating a preview image of an object includes the steps of detecting an object to determine whether the type of the object is text, graphics, or image, converting a color signal of the detected object into an image forming color signal by using a color profile corresponding to the detected object, and creating and displaying a preview image for the object converted into the image forming color signal.

According to yet another aspect of the present invention, a computer-readable recording medium has a computer-readable program for executing a method including the steps of detecting an object to be previewed to determine whether the type the object is text, graphics, or image, converting a color signal of the detected object into an image forming color signal by using a color profile corresponding to the detected object, and creating and displaying a preview image for the object converted into the image forming color signal.

According to yet another aspect of the present invention, an apparatus for creating a preview image of an object includes means for detecting an object to determine whether the object is text, graphics, or image, means for converting a color signal of the detected object into an image forming color signal by using a color profile corresponding to the detected object, and means for displaying a preview image of the object converted into the image forming color signal.

BRIEF DESCRIPTION OF THE DRAWINGS

The above and other objects, features, and advantages of certain exemplary embodiments of the present invention will be more apparent from the following description taken in conjunction with the accompanying drawings, in which:

FIG. 3 is a flowchart of a method for creating a preview image of an object according to an exemplary embodiment of the present invention.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An apparatus and method for creating a preview image of an object according to an exemplary embodiment of the present invention will now be described more fully with reference to the accompanying drawings.

Figure 1:
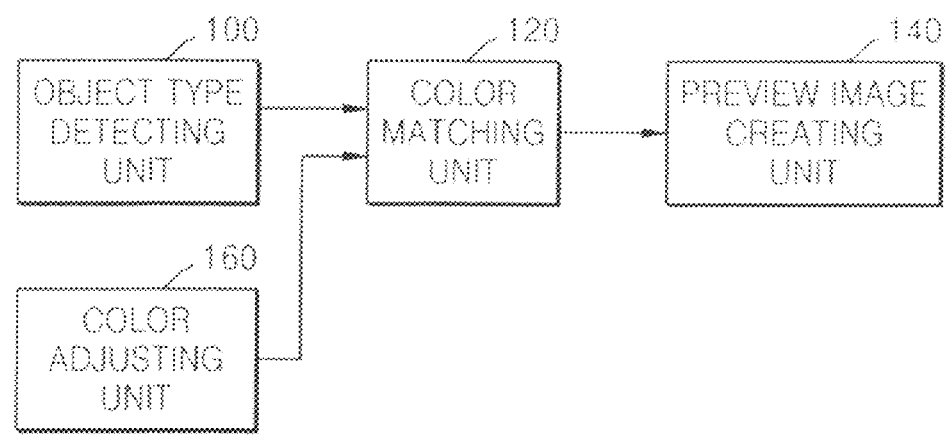
FIG. 1 is a block diagram of an apparatus for creating a preview image of an object according to an exemplary embodiment of the present invention.

FIG. 1 is a block diagram of an apparatus for creating a preview image of an object according to an exemplary embodiment of the present invention. The apparatus includes an object type detecting unit 100, a color matching unit 120, a preview image creating unit 140, and a color adjusting unit 160.

The object type detecting unit 100 detects an object to be previewed to determine whether the object type is text, graphics, or image, and the object type detecting unit 100 outputs the detection result to the color matching unit 120.

According to the detection result from the object type detecting unit 100, the color matching unit 120 converts a color signal of the detected object into a corresponding image forming color signal by using a color profile corresponding to the detected object type, and then the color matching unit 120 outputs the converted result to the preview image creating unit 140.

The color matching unit 120 converts an RGB color signal of the detected object into a CMYK color signal.

The color matching unit 120 includes a table for storing color profiles corresponding to text, graphics, and image objects. Therefore, if a detected object is text, the color matching unit 120 converts the color signal of the object into an image forming color signal by using a color profile corresponding to text. If the detected object is graphics, the color matching unit 120 converts the color signal of the object into an image forming color signal by using a color profile corresponding to graphics. If the detected object is an image, the color matching unit 120 converts the color signal of the object into an image forming color signal by using a color profile corresponding to images.

The preview image creating unit 140 creates and displays a preview image for the object converted into the image forming color signal.

When the preview image creating unit 140 receives the converted object from the color matching unit 120, the preview image creating unit 140 creates a preview image for the converted object. The preview image creating unit 140 displays the created preview image on a display screen.

Figure 2:
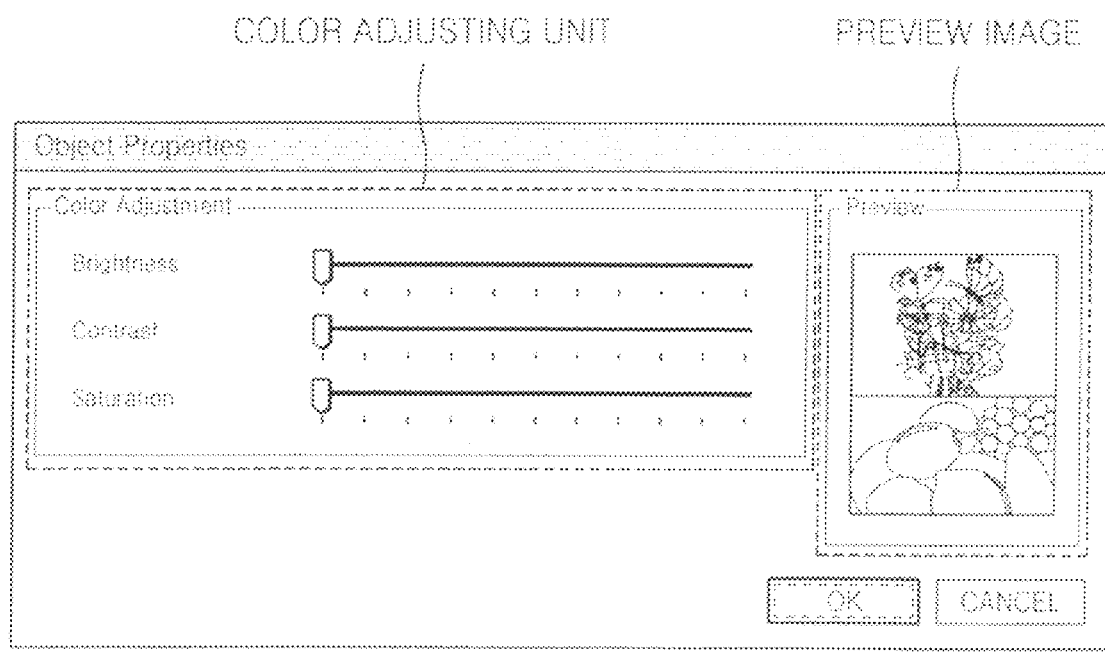
FIG. 2 shows a preview image and a user interface screen of a color adjusting unit according to an exemplary embodiment of the present invention.

FIG. 2 shows a preview image and a user interface screen of a color adjusting unit according to an exemplary embodiment of the present invention. Referring to FIG. 2, a preview image is displayed on a monitor so that a user can check the preview image.

The color adjusting unit 160 adjusts the color of the displayed preview image, and outputs the adjusted result to the color matching unit 120.

The color adjusting unit 160 adjusts brightness, contrast, and saturation. As shown in FIG. 2, the color adjusting unit 160 includes bars for adjusting the brightness, the contrast, and the saturation. The color adjusting unit 160 outputs the color adjusted by a user to the color matching unit 120.

The color matching unit 120 converts the color signal of the adjusted object from the color adjusting unit 160 into an image forming color signal, and the color matching unit 120 outputs the converted result to the preview image creating unit 140.

The preview image creating unit 140 creates and displays a preview image for the object of which the color is adjusted and converted. Therefore, since the preview image creating unit 140 displays the preview image in real-time in response to the color adjustment of the color adjusting unit 160, a user can print text, graphics, or image data with desired color characteristics.

A method for creating a preview image of an object will now be described in detail with reference to the accompanying drawings according to the present invention.

FIG. 3 is a flowchart of a method for creating a preview image of an object according to an exemplary embodiment of the present invention.

In operation 200, an object to be previewed is detected to determine whether the type of the object is text, graphics, or image.

In operation 202, a color signal of the detected object is converted into an image forming color signal by using a color profile corresponding to the detected object type.

An RGB color signal of the detected object is converted into a CMYK color signal.

A table storing color profiles corresponding to text, graphics, and image is used to convert the color signal of the detected object into the image forming color signal.

If the detected object is text, a color profile corresponding to text is used to convert the color signal of the object into the image forming color signal. If the detected object is graphics, a color profile corresponding to graphics is used to convert the color signal of the object into the image forming color signal. If the detected object is an image, a color profile corresponding to images is used to converts the color signal of the object into the image forming color signal.

In operation 204, a preview image is created and displayed for the object converted into the image forming color signal. That is, a preview image for the converted object is created, and then the created preview image is displayed on a display screen.

In operation 206, the color of the displayed preview image is adjusted.

The color adjustment is characterized in that brightness, contrast, and saturation of the preview image are adjusted. As shown in FIG. 2, the color properties of the object are adjusted using bars provided for adjusting the brightness, the contrast, and the saturation.

In operation 208, the color signal of the color-adjusted object is converted into an image forming color signal.

In operation 210, a preview image is created and displayed for the object with the adjusted and converted color. Therefore, since the preview image is displayed in real-time in response to the color adjustments by a user, a user can print text, graphic, or image data with desired color characteristics.

The exemplary embodiments of the present invention can also be embodied as computer-readable code/instructions/programs and can be implemented in general-use digital computers that execute the code/instructions/programs using a computer readable recording medium. Examples of computer readable recording medium include magnetic storage media (for example, ROM, floppy disks, hard disks, etc.), and optical recording media (for example, CD-ROMs, or DVDs). Further, the exemplary embodiments of the present invention can be embodied as a computer-readable medium having computer-readable code, and the computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

According to the present invention, the apparatus and method for creating a preview image of an object is designed to display the preview image on a monitor according to the type of the object (text, graphics, or image), so that a user can predict the image forming result more accurately. Further, since the colors of objects can be adjusted, a printout with desired color characteristics can be obtained.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for creating a preview image for each selected object, wherein an office application preview image is provided by an office application program that processes text and/or graphics, the apparatus comprising:

an object type detecting unit for detecting a selected object to determine whether the type of the object is text, graphics, or image, the object being selected by a user from the office application preview image which includes text and/or graphics;
a color matching unit for converting a color signal of the detected object into an image forming color signal by using a color profile corresponding to the detected object type;
a preview image creating unit for creating and displaying a preview image for each object converted into the image forming color signal; and
a color adjusting unit for adjusting levels of brightness, contrast, and saturation of the displayed preview image created by the preview image creating unit, and when a preference color is selected by the user, changing a color of the preview image to the selected preference color.

2. The apparatus of claim 1, wherein the color matching unit converts an RGB color signal of the detected object into a CMYK color signal.

3. The apparatus of claim 1, wherein the color matching unit includes a table for storing color profiles corresponding to text, graphic, and image object types.

4. The apparatus of claim 1, wherein the color adjusting unit, when a background color is selected by the user, adds a color to a background of the display object.

5. The apparatus of claim 1, wherein the color adjusting unit, if there is a blank space in the displayed object, deletes the blank space of the displayed object according to a user's selection.

6. The apparatus of claim 1, wherein the color matching unit is adapted to convert a color signal of the color-adjusted or color-changed object into an image forming color signal.

7. A method of creating a preview image of each selected object, wherein an office application preview image is provided by an office application program that processes text and/or graphics, the method comprising the steps of:
detecting an object to determine whether the type of the object is text, graphics, or image, the object being selected by a user from the office application preview image which includes text and/or graphics;
converting a color signal of the detected object into an image forming color signal by using a color profile corresponding to the detected object;
creating and displaying a preview image for the object converted into the image forming color signal; and
adjusting levels of brightness, contrast, and saturation levels of the created and displayed preview image for each object and displaying the adjusted preview image for each object, and when a preference color is selected by the user, changing a color of the preview image to the selected preference color.

8. The method of claim 7, wherein the step of converting the color signal comprises converting an RGB color signal of the detected object into a CMYK color signal.

9. The method of claim 7, wherein the step of converting the color signal comprises converting the color signal of the detected object into the image forming color signal by using a table storing color profiles corresponding to text, graphic, and image object types.

10. The method of claim 7, further comprising: if a background color is selected by the user, adding a color to a background of the display object.

11. The method of claim 7, further comprising: if there is a blank space in the displayed object, deleting the blank space of the displayed object according to a user's selection.

12. The method of claim 7, wherein the step of adjusting and changing comprises converting a color signal of the color-adjusted object into an image forming color signal.

13. A non-transitory computer-readable recording medium having a computer-readable program for executing a method comprising the steps of:
detecting an object to be previewed to determine whether the type the object is text, graphics, or image, the object being selected by a user from an office application preview image which includes text and/or graphics;
converting a color signal of the detected object into an image forming color signal by using a color profile corresponding to the detected object;
creating and displaying a preview image for the object converted into the image forming color signal; and
adjusting levels of brightness, contrast, and saturation levels of the created and displayed preview image for each object and displaying the adjusted preview image for each object and when a preference color is selected by the user, changing a color of the preview image to the selected preference color.

14. An apparatus for creating a preview image of a selected object, wherein an office application preview image is provided by an office application program that processes text and/or graphics, the apparatus comprising
means for detecting an object to determine whether the object is text, graphics, or image, the object being selected by a user from the office application preview image which includes text and/or graphics;
means for converting a color signal of the detected object into an image forming color signal by using a color profile corresponding to the detected object;
means for displaying a preview image of the object converted into the image forming color signal; and
means for adjusting brightness, contrast, and saturation levels of the displayed preview image displayed by the displaying means, and when a preference color is selected by the user, changing a color of the preview image to the selected preference color.

15. The apparatus of claim 14, wherein the means for adjusting and changing, if a background color is selected by the user, adds a color to a background of the display object.

16. The apparatus of claim 14, wherein the means for adjusting and changing, if there is a blank space in the displayed object, deletes the blank space of the displayed object according to a user's selection.

* * * * *